(12) United States Patent
Oakes (10) Patent No.: US 10,597,120 B2
(45) Date of Patent: Mar. 24, 2020

(54) CLAMP WITH LOCKING TAB TO SECURE BOAT WINDSHIELD

(71) Applicant: Taylor Made Group, LLC, Gloversville, NY (US)

(72) Inventor: Philip A. Oakes, Middle Grove, NY (US)

(73) Assignee: TAYLOR MADE GROUP, LLC, Gloversville, NY (US)

( * ) Notice: Subject to any disclaimer, the term of this patent is extended or adjusted under 35 U.S.C. 154(b) by 0 days.

(21) Appl. No.: 16/142,304

(22) Filed: Sep. 26, 2018

(65) Prior Publication Data

US 2019/0100284 A1 Apr. 4, 2019

Related U.S. Application Data

(60) Provisional application No. 62/565,401, filed on Sep. 29, 2017.

(51) Int. Cl.
| | |
|---|---|
| B63B 17/02 | (2006.01) |
| F16B 5/06 | (2006.01) |
| F16B 2/06 | (2006.01) |
| F16B 5/00 | (2006.01) |
| F16B 5/12 | (2006.01) |
| F16B 2/10 | (2006.01) |

(52) U.S. Cl.
CPC .............. *B63B 17/02* (2013.01); *F16B 2/065* (2013.01); *F16B 2/10* (2013.01); *F16B 5/008* (2013.01); *F16B 5/0088* (2013.01); *F16B 5/0614* (2013.01); *F16B 5/0685* (2013.01); *F16B 5/121* (2013.01)

(58) Field of Classification Search
CPC ......... B63B 17/02; F16B 2/065; F16B 5/0685
See application file for complete search history.

(56) References Cited

U.S. PATENT DOCUMENTS

| | | | |
|---|---|---|---|
| 8,166,725 B2 | 5/2012 | Griffith | |
| 8,656,594 B2 | 2/2014 | Griffith | |
| 9,126,656 B2 | 9/2015 | Griffith | |
| 2016/0281881 A1* | 9/2016 | Vaccaro | F16B 1/00 |

\* cited by examiner

*Primary Examiner* — Stephen P Avila
(74) *Attorney, Agent, or Firm* — Nixon & Vanderhye P.C.

(57) ABSTRACT

A bottom trim clamp assembly secures a windshield and bottom trim member with connecting structure to a boat surface. The bottom trim clamp assembly includes a base clamp securable to the boat surface and having at least one base tab cooperable with the connecting structure. A locking tab selectively securable to the base clamp is also cooperable with the connecting structure. The clamp assembly can be secured to the boat surface prior to shipping to facilitate full installation of the windshield after shipping.

18 Claims, 7 Drawing Sheets

CLAMP WITH LOCKING TAB TO SECURE BOAT WINDSHIELD

CROSS-REFERENCES TO RELATED APPLICATIONS

This application claims the benefit of U.S. Provisional Patent Application No. 62/565,401, filed Sep. 29, 2017, the entire content of which is herein incorporated by reference.

STATEMENT REGARDING FEDERALLY SPONSORED RESEARCH OR DEVELOPMENT (NOT APPLICABLE)

BACKGROUND

The invention relates to a clamp with a locking tab to secure a boat windshield and, more particularly, to a clamp that makes boat windshield application and removal simpler, easier and more efficient.

Systems for mounting curved sheet elements to a surface, particularly mounting curved windshields to the deck of a boat, are known. One such mounting system includes an elongated member having upper, intermediate and lower portions where the upper portion includes, in cross-section, a generally channel-shaped receptacle for receiving the lower edge of the curved windshield. The lower portion includes a flat that extends from the intermediate portion at an angle of approximately 45° relative to the base of the channel-shaped upper portion. The intermediate portion includes angularly related portions connected along one edge intermediate of and to the base of the channel while the other angularly related portion extends rearwardly for connection with the flat. The forward portion of the flat terminates in a free edge defining a receptacle for receiving the trim piece with the base of the channel, the intermediate portion and the inside surface of the flat.

In using such a mounting system, it is necessary to bend the elongated member to conform it to the curvature of the lower edge of the glass. In bending the member, however, twisting also occurs, causing the flat to stand up from the deck. That is, the flat will not maintain a flush continuous contact with the deck over the full length of the member. Additionally, the mounting member is secured to the deck by screws disposed through the flat. The compound curvature of the mounting member, however, makes it difficult to mount the screws and secure the mounting member and windshield to the deck. Even after such securement, gaps appear between the mounting member and the deck.

Some boats are using a flush glazed window that hides the bottom trim so that it is not seen from the outside of the boat. Design approaches to achieve this flush glazed look have used either a combination of two bottom trims, one that is mounted to the boat deck and the other that is mounted to the inside of the windshield, or trims that have fixed angles. The first approach is often bulky and requires twice the number of extrusions as a standard mounting system. The second approach is limited in the angle between the windshield and the boat deck such that it is unusable on the boat deck if the angle changes much along the length of the windshield, as most boat windshields do.

U.S. Pat. Nos. 8,166,725, 8,656,594 and 9,126,656 describe a bottom trim member that secures a windshield on a boat deck. The bottom trim member includes a bottom trim extrusion with a connecting leg affixable to the windshield and a gasket receiving leg. A gasket is disposed in engagement with the gasket receiving leg. The gasket is shaped such that the bottom trim extrusion is positionable in multiple orientations relative to the boat deck and such that the gasket maintains a sealing engagement in any of the bottom trim extrusion multiple orientations. A securing member is affixable to the boat deck and cooperable with the bottom trim extrusion to secure the bottom trim extrusion to the boat deck in any one of the bottom trim extrusion multiple orientations.

BRIEF SUMMARY

The described embodiments endeavor to make windshield application and removal simpler, easier and more efficient. The construction enables a base clamp to be installed after appropriately positioning a windshield on the deck. Once the base clamp is installed, the windshield can be removed for packaging and shipping, etc. At the delivery destination, such as a dealership or the like, the windshield can be placed against the already secured base clamp, and with the windshield engaging the base clamp, a locking tab may be inserted to secure the windshield assembly in place. With the assembly of the described embodiments, tracing and guesswork are not required, and windshield installation can be easily and accurately accomplished.

In an exemplary embodiment, a bottom trim clamp assembly secures a windshield and bottom trim member with connecting structure to a boat surface. The bottom trim clamp assembly includes a base clamp securable to the boat surface and having at least one base tab oriented to extend upward away from the boat surface and being cooperable with the connecting structure. A locking tab selectively securable to the base clamp is oriented to extend downward toward the boat surface and is cooperable with the connecting structure. The locking tab may be securable to the base clamp with a connector. The at least one base tab and the locking tab may define a space configured to receive and secure a portion of the bottom trim member connecting structure. The base clamp may include at least one aperture configured to receive a connector that secures the base clamp to the boat surface. In some embodiments, the assembly includes two of the base tabs, where the locking tab may be securable to the base clamp between the two base tabs. The base clamp may also include an extension member configured to receive a bottom-most portion of the bottom trim member. The locking tab may be provided with at least one circumferential tooth on an inside surface that protrudes from the inside surface.

In another exemplary embodiment, a boat windshield assembly includes a windshield and a bottom trim member secured to the windshield. The bottom trim member has connecting structure including a concave distal end, a protrusion and an upper portion. The boat windshield assembly also includes the bottom trim clamp assembly for securing the windshield and the bottom trim member to a boat surface.

The protrusion may be spaced from the upper portion to define a base tab slot, where the at least one base tab may be engaged with the protrusion and may also be disposed in the base tab slot. The locking tab may be selectively engageable with the protrusion. In this context, the concave distal end may be spaced from the protrusion to define a locking tab slot, where the locking tab may be selectively engageable with the protrusion in the locking tab slot. The base tab slot and the locking tab slot may have respective depths that permit the bottom trim member to be displaceable relative to the bottom trim clamp assembly between an upright position and an inclined orientation. In this context, in the upright position, the bottom trim member may be substantially vertical such that the windshield may be oriented about 90° relative to the boat surface. In the inclined orientation, the bottom trim member may be inclined at an angle of about 35° relative to the boat surface.

The base clamp may include an extension member that may be engageable with the concave distal end of the bottom trim member. The extension member may be spaced from the locking tab to define a bottom slot, where the concave distal end of the bottom trim member may be disposed in the bottom slot.

The at least one base tab and the locking tab may be engageable with the protrusion on opposite sides of the protrusion, where the at least one base tab and the locking tab may be configured to secure the bottom trim member to the bottom trim clamp assembly. The at least one base tab and the locking tab may be curved to surround the protrusion in a claw grip.

In yet another exemplary embodiment, a method of securing a windshield with a bottom trim member to a boat surface using a bottom trim clamp assembly includes the steps of (a) positioning the windshield and the bottom trim member on the boat surface; (b) engaging the bottom trim clamp assembly with the connecting structure of the bottom trim; (c) securing the bottom trim clamp assembly to the boat surface; and (d) engaging the locking tab with the bottom trim member and securing the locking tab to the base clamp. The method may further include, after step (c) and before step (d), removing the windshield and the bottom trim member from the boat surface for shipping.

BRIEF DESCRIPTION OF THE DRAWINGS

These and other aspects and advantages will be described in detail with reference to the accompanying drawings, in which.

DETAILED DESCRIPTION

Figure 1:
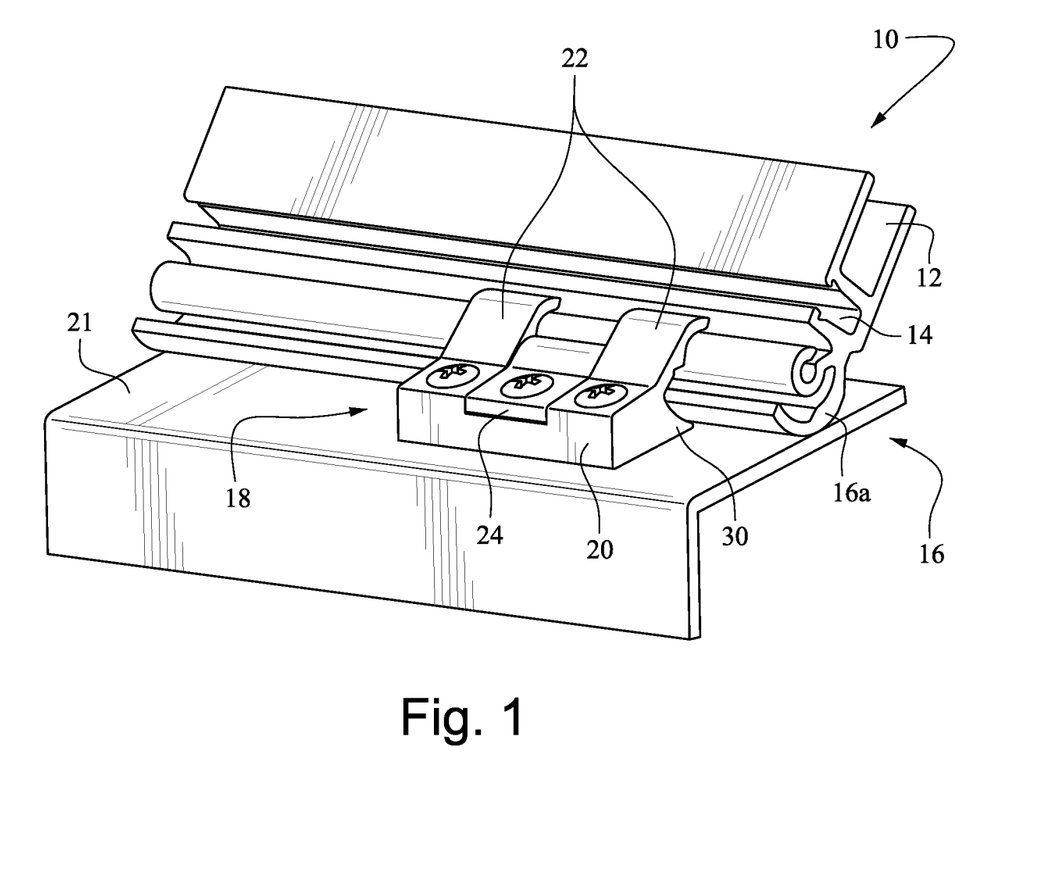
FIG. 1 is a perspective view of the bottom trim clamp assembly securing a windshield bottom trim member.

With reference to FIG. 1, a bottom trim member 10 includes a windshield receiving channel 12, an optional clip channel 14, and connecting structure 16 cooperable with a bottom trim clamp assembly 18. A windshield is received in the windshield channel 12. The clip channel 14, if included, is generally configured for receiving a fastener clip or the like, which may be used for securing external features such as a boat cover.

Figure 2:
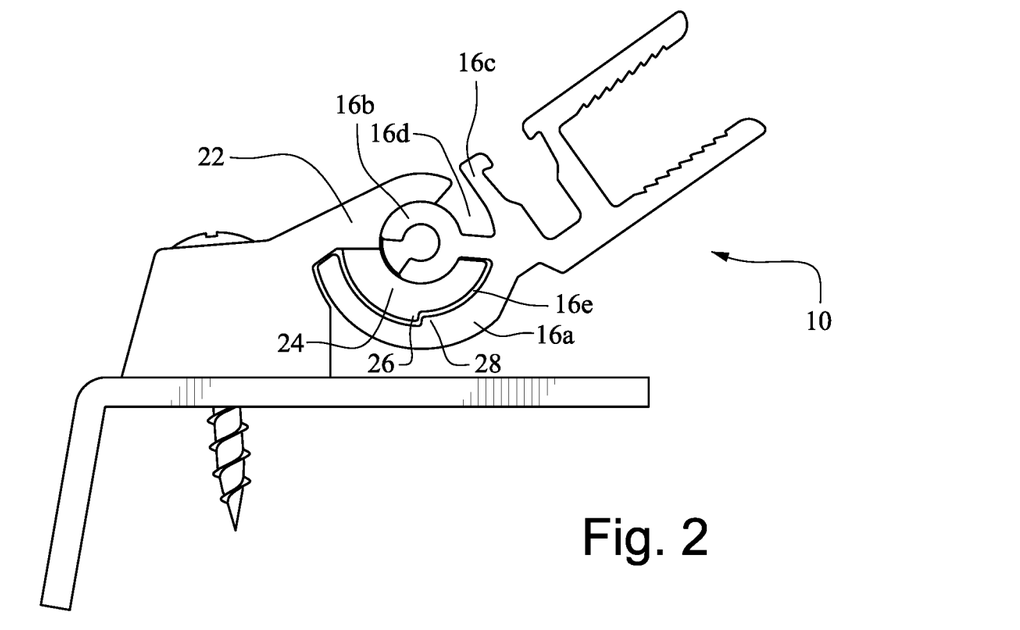
FIG. 2 is a side view thereof with the bottom trim member in an inclined orientation.

The bottom trim clamp assembly 18 includes a base clamp 20 that is securable to supporting structure 21 such as a boat surface or the like with bolts or other suitable connectors. The base clamp 20 includes one or more base tabs 22 that are oriented to extend upward and away from the supporting surface 21 and are cooperable with the connecting structure 16 of the bottom trim member 10. The base tabs 22 are positionable adjacent the connecting structure 16 when installing the windshield. A locking tab 24 is selectively securable to the base clamp 20. As shown in FIG. 2, the locking tab 24 is oriented to extend downward toward the support surface 21 and is similarly cooperable with the connecting structure 16 of the bottom trim member 10. In a preferred construction, the bottom trim clamp assembly 18 includes two of the base tabs 22, where the locking tab 24 is selectively securable to the base clamp between the two base tabs 22. The locking tab 24 may be secured to the base clamp 20 by a bolt or other suitable connecting structure. As described in more detail below, the locking tab 24 fixes the bottom trim 10 in position.

Figure 3:
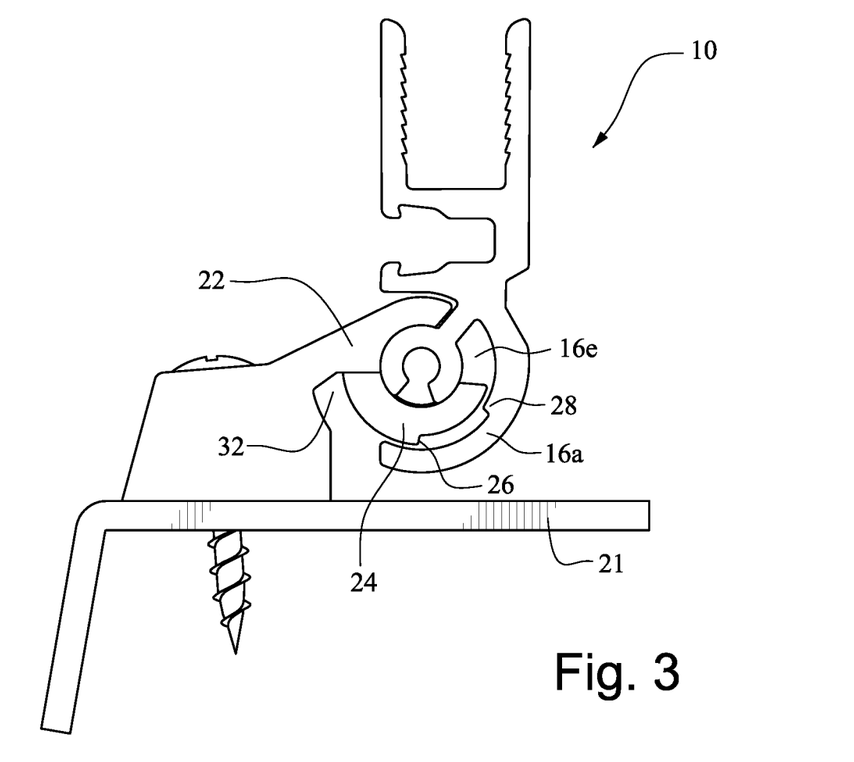
FIG. 3 is a side view thereof with the bottom trim member in an upright position.

In the exemplary embodiments shown in FIGS. 1-3, the connecting structure 16 includes a concave distal end 16a, a circumferential protrusion or key 16b and an upper portion 16c. Other configurations of the connecting structure 16 may be suitable, and the invention is not necessarily meant to be limited to the connecting structure shown and described.

With continued reference to FIG. 2, the one or more base tabs 22 are engageable with the protrusion 16b. The protrusion 16b is spaced from the upper portion 16c to define a base tab slot 16d. The one or more base tabs 22 are engaged with the protrusion 16b and are disposed in the base tab slot 16d.

The locking tab 24 is selectively engageable with the protrusion 16b. As shown, the concave distal end 16a is spaced from the protrusion 16b to define a locking tab slot 16e (as seen in FIG. 3). The locking tab 24 is selectively engageable with the protrusion 16b in the locking tab slot 16e.

The base tab slot 16d and the locking tab slot 16e have respective depths that permit the bottom trim member 10 to be displaceable relative to the bottom trim clamp assembly 18 between an inclined position/orientation as shown in FIG. 2 and an upright position/orientation as shown in FIG. 3. In an exemplary embodiment, in the upright position, the bottom trim member 10 may be substantially vertical such that the windshield is oriented about 90° relative to the support surface 21. In the inclined orientation, the bottom trim member 10 may be inclined at an angle of about 35° relative to the support surface 21. The bottom trim member may be positioned in any orientation between the upright position and the inclined position. As shown in FIGS. 2 and 3, an exterior surface of the locking tab 24 and an interior surface of the concave distal end 16a may be provided with respective shoulders 26, 28 that engage each other when the bottom trim member 10 is oriented in the inclined position as shown in FIG. 2. The shoulders 26, 28 can provide added support for the windshield assembly in the inclined position and also provide a suitable shape for assembly clearance. That is, the resulting shape by the shoulders 26, 28 allows clearance for the locking tab 24 to align and engage the bottom trim member 10 at any bottom trim angle (see, e.g., FIG. 4F).

In the exemplary embodiment shown in FIG. 1, the base clamp 18 is provided with an extension member 30 that is engageable with the concave distal end 16a of the bottom trim member 10. With the locking tab 24 secured to the base clamp 20, the extension member 30 is spaced from the locking tab 24 to define a bottom slot 32 (see FIG. 3). As shown, the concave distal end 16a of the connecting structure 16 is positioned in the bottom slot 32.

The one or more base tabs 22 and the locking tab 24 are engageable with the protrusion 16b on opposite sides of the protrusion 16*b*. As shown, the one or more base tabs 22 and the locking tab 24 are curved to surround the protrusion 16*b* in a claw grip.

Figure 5:
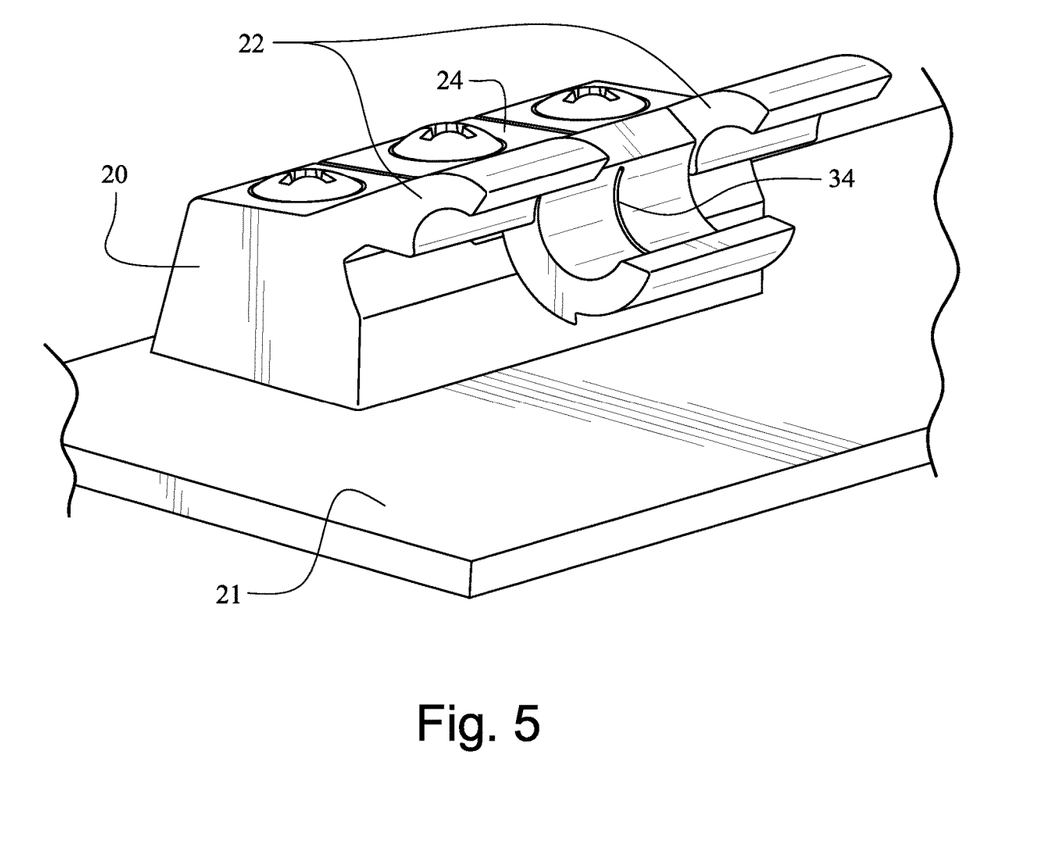
FIG. 5 is a perspective view from the windshield side of the bottom trim clamp assembly.

In some embodiments, with reference to FIG. 5, the locking tab 24 and/or the base clamp 20 may be provided with one or more circumferential teeth 34 on an inside surface that protrudes from the inside surface. The circumferential teeth 34 grab onto the bottom trim 10 when installed to prevent side-to-side displacement of the bottom trim 10 during installation and use.

Figure 4A:
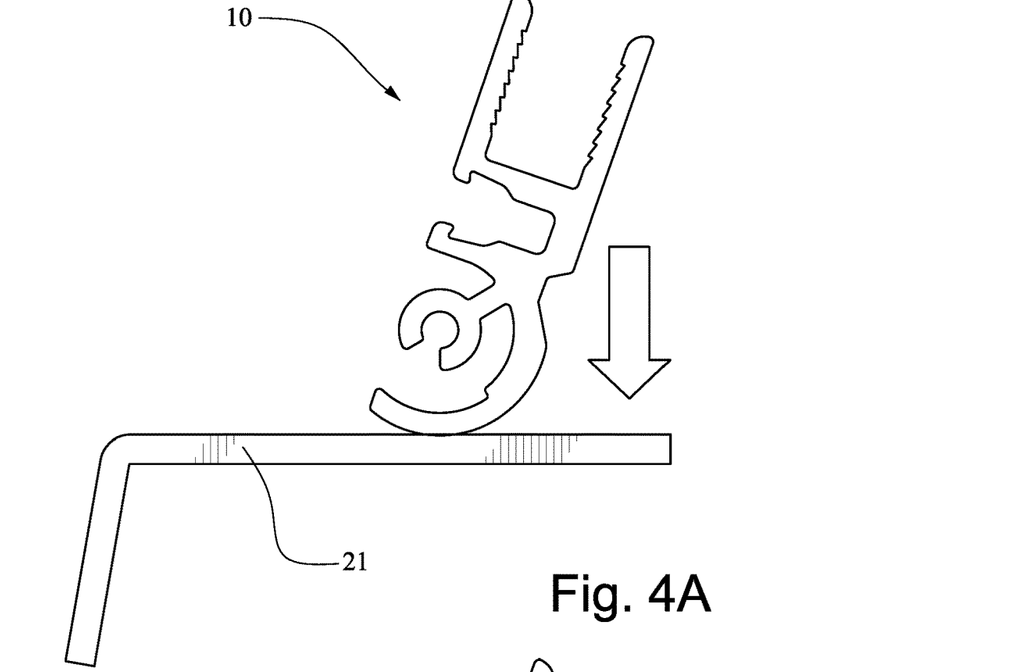
FIGS. 4A-4H show an exemplary application/methodology of securing a windshield with a bottom trim member to a boat surface using the bottom trim clamp assembly of the described environments.
Figure 4B:
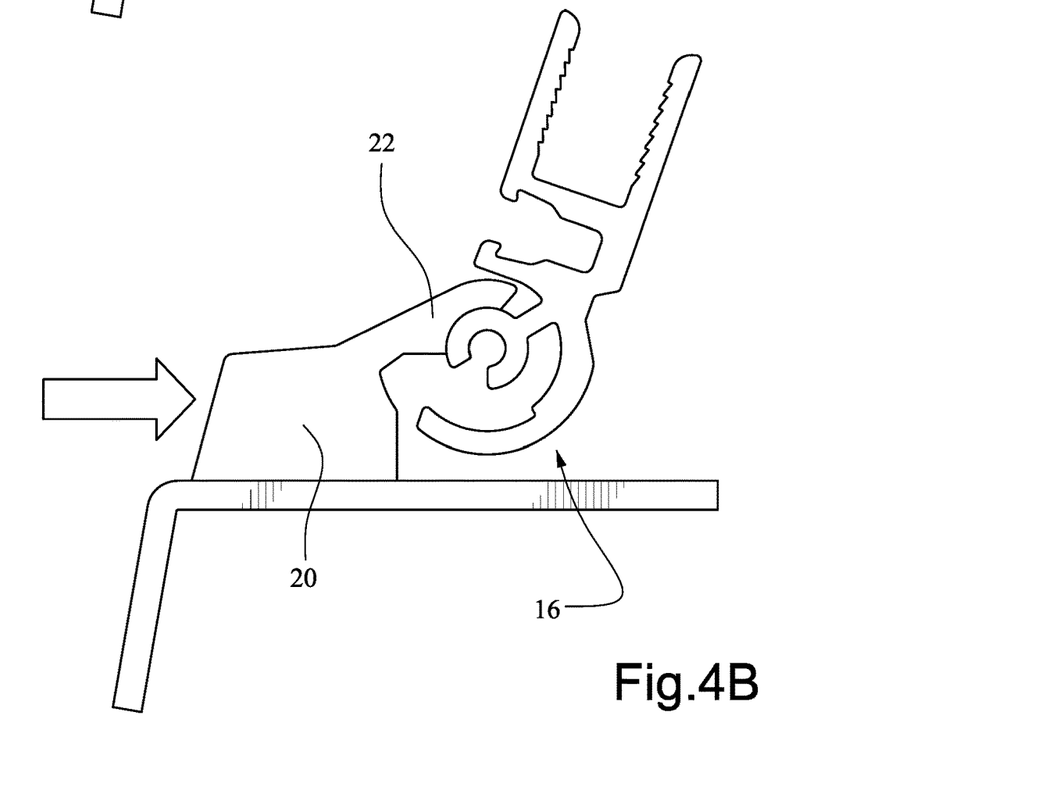
Figure 4C:
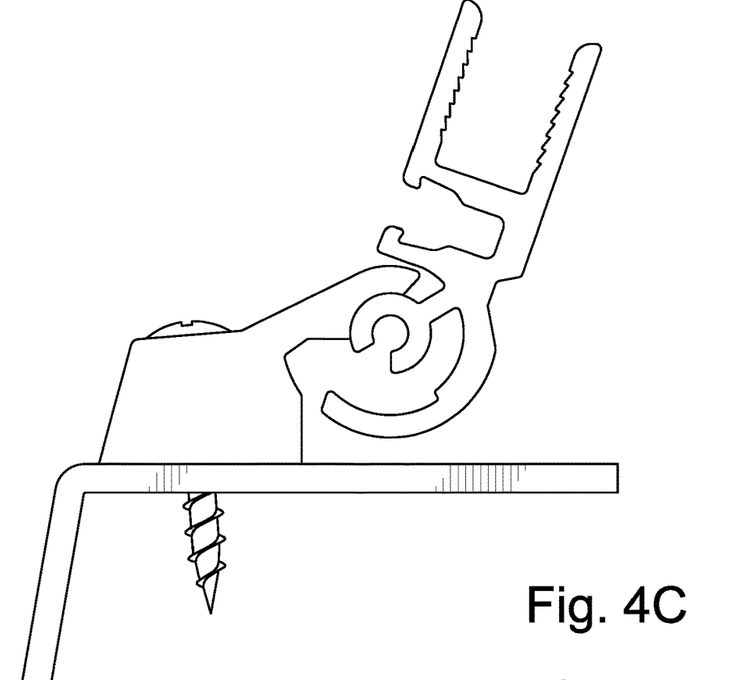
Figure 4D:
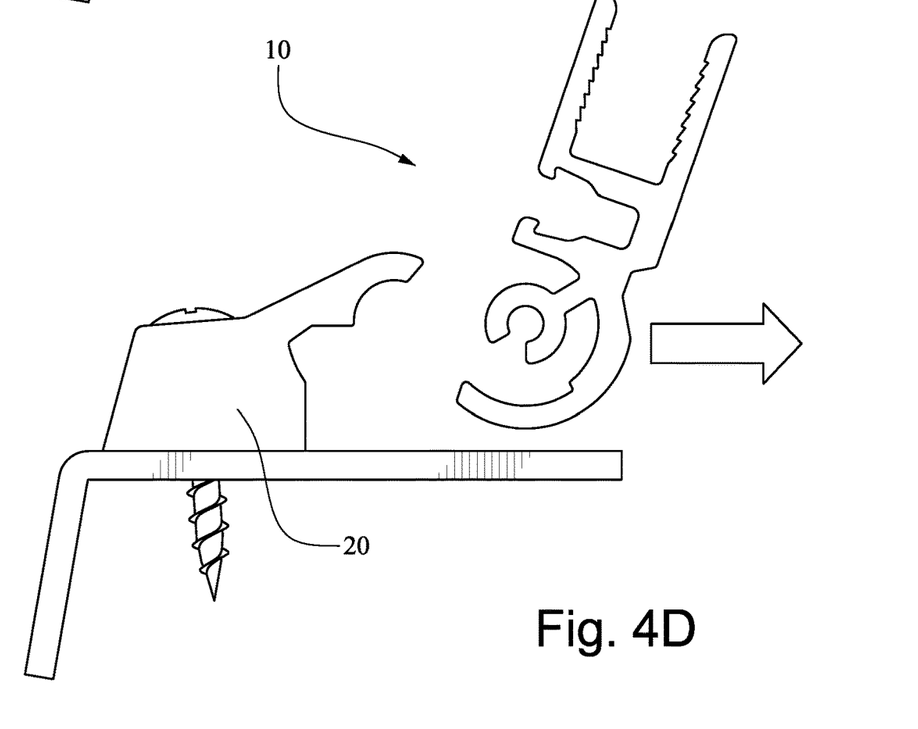

With reference to FIGS. 4A-4H, in an exemplary assembly operation, with continued reference to the drawings, the pre-assembled windshield (i.e., including the bottom trim attached) can be positioned on the deck 21. Subsequently, the base clamp 20 is positioned with the base tabs 22 in engagement with the connecting structure 16 (FIG. 4B), and the base clamp is secured to the deck 21 (FIG. 4C). With the base clamp 20 secured to the deck 21, the windshield and bottom trim 10 can then be removed (FIG. 4D). In this manner, the windshield may be removed for shipping, storage or the like.

Figure 4E:
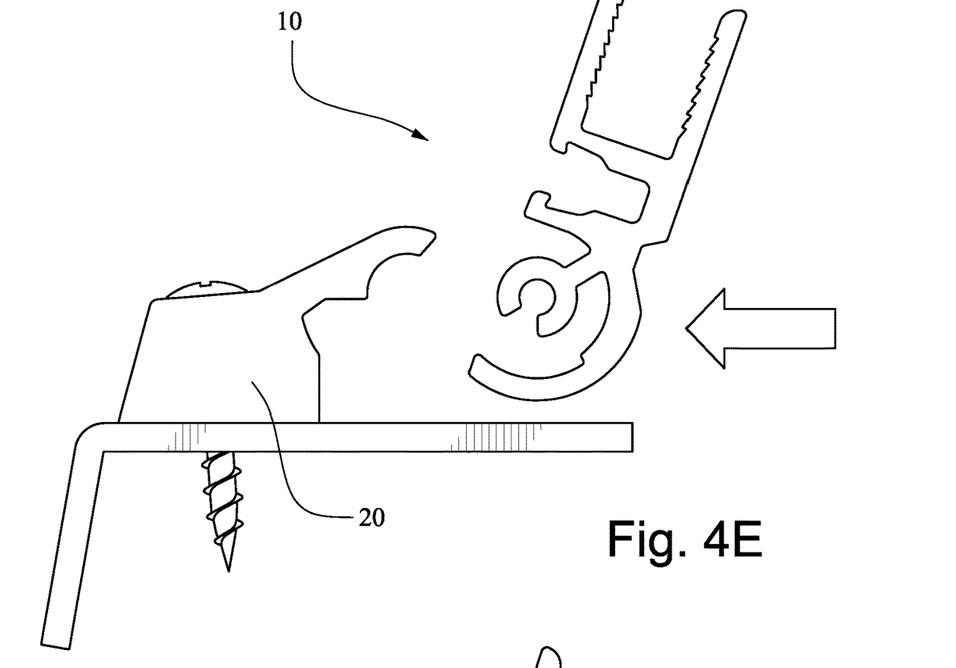
Figure 4F:
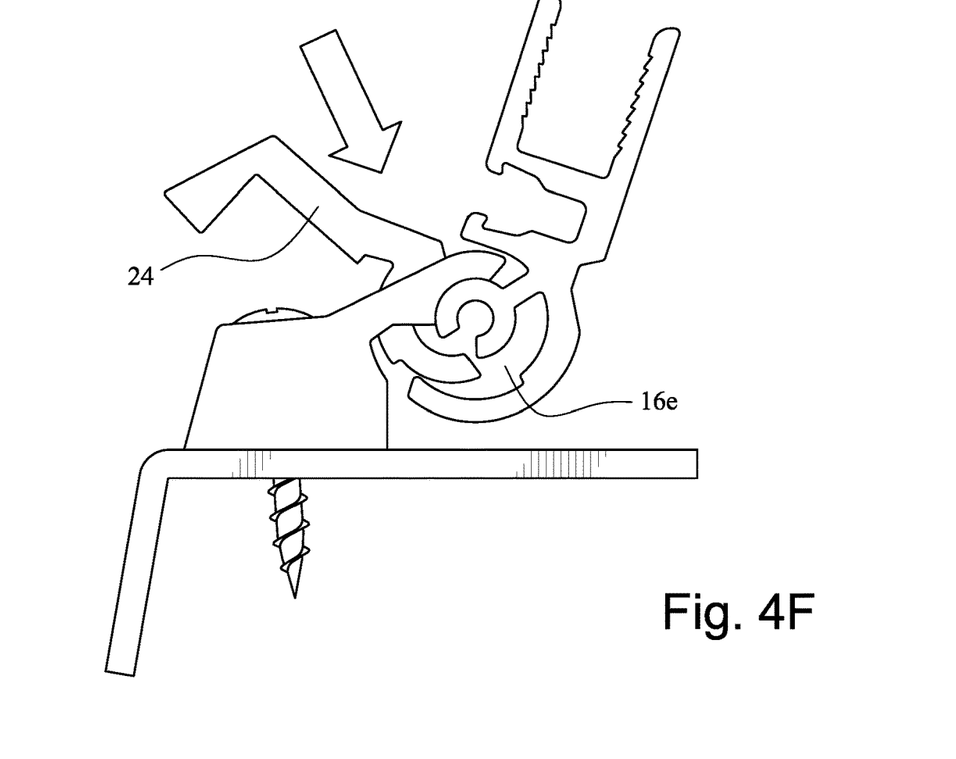
Figure 4G:
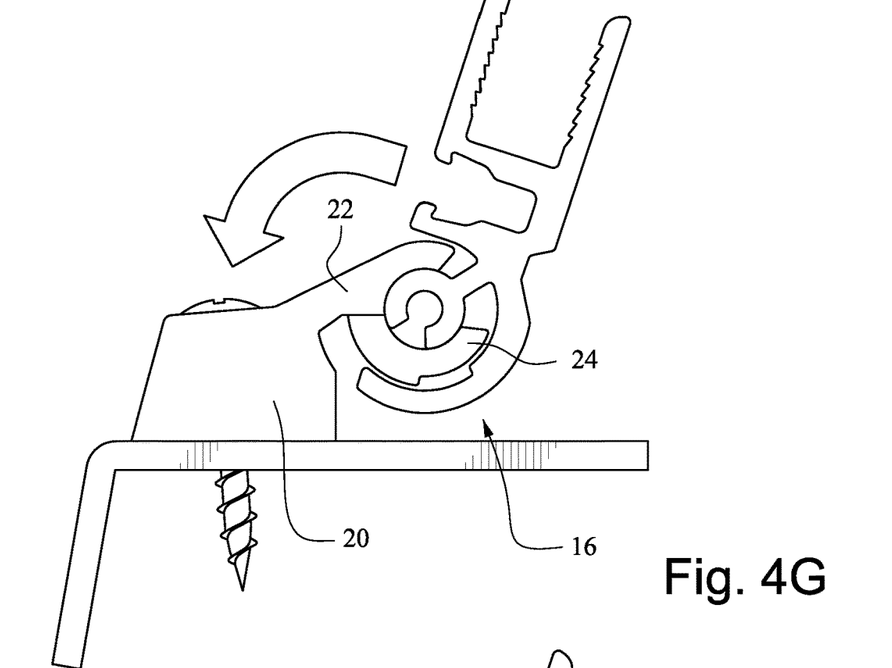
Figure 4H:
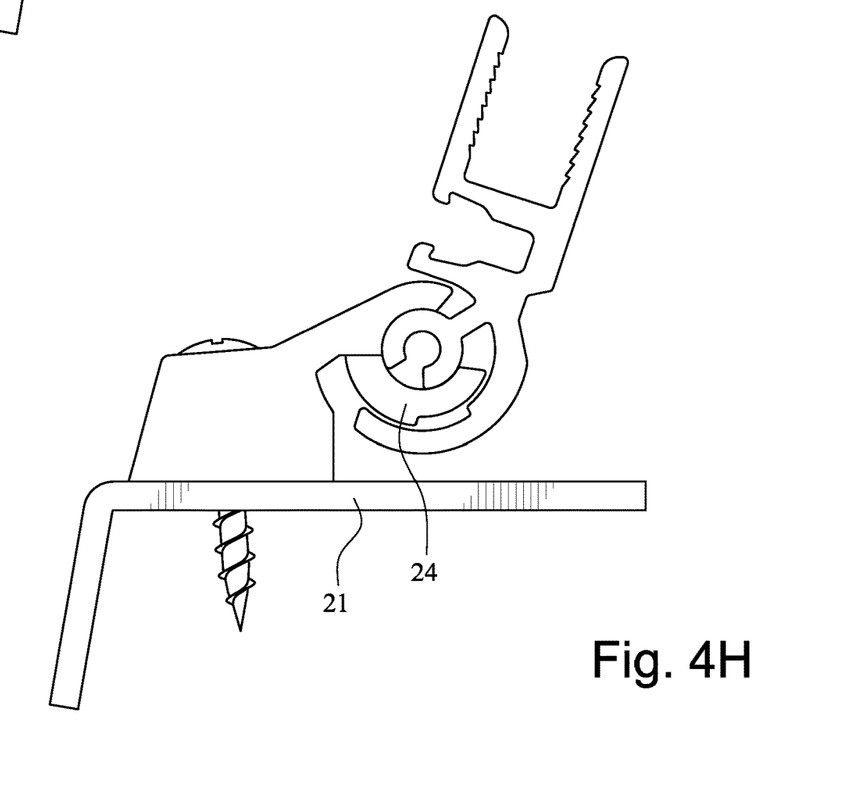

When it is time to fully install the windshield, tracing and guesswork are not required. The windshield is simply re-engaged with the base clamp 20 (FIG. 4E), and once positioned, the locking tab 24 may be inserted into the locking tab slot 16*e* (FIG. 4F) and then rotated to engage the connecting structure 16 of the bottom trim and to engage the base clamp 20 to fix the windshield in position (FIG. 4G). The locking tab 24 is then secured to the base clamp 20 with a suitable connector (FIG. 4H). Minor adjustments can be made by sliding the windshield under the base clamps 20. As shown in FIG. 4H, in some embodiments, when fully assembled, the bottom trim member 10 is slightly spaced off the deck 21.

Unlike some existing designs, the assembly does not rely on a deck seal to secure the bottom trim to the clamp. The assembly similarly does not rely on the deck for attachment or clamping force. In fact, as noted, the bottom trim in some configurations could be spaced from the deck. A foam deck seal or caulk or the like may be provided to prevent water from passing through the windshield, but this sealing material is not required to secure the bottom trim to the clamp.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A bottom trim clamp assembly for securing a windshield to a boat surface, the windshield including a bottom trim member with connecting structure, the bottom trim clamp assembly comprising:
   a base clamp securable to the boat surface, the base clamp including at least one base tab being oriented to extend upward away from the boat surface and being cooperable with the connecting structure; and
   a locking tab selectively securable to the base clamp, the locking tab being oriented to extend downward toward the boat surface and being cooperable with the connecting structure, wherein the locking tab is securable to the base clamp with a connector.

2. A bottom trim clamp assembly according to claim 1, wherein the at least one base tab and the locking tab define a space that is configured to receive and secure a portion of the bottom trim member connecting structure.

3. A bottom trim clamp assembly according to claim 1, wherein the base clamp comprises at least one aperture that is configured to receive a connector that secures the base clamp to the boat surface.

4. A bottom trim clamp assembly for securing a windshield to a boat surface, the windshield including a bottom trim member with connecting structure, the bottom trim clamp assembly comprising:
   a base clamp securable to the boat surface, the base clamp including two base tabs being oriented to extend upward away from the boat surface and being cooperable with the connecting structure; and
   a locking tab selectively securable to the base clamp, the locking tab being oriented to extend downward toward the boat surface and being cooperable with the connecting structure, wherein the locking tab is securable to the base clamp between the two base tabs.

5. A bottom trim clamp assembly according to claim 1, the base clamp further comprising an extension member that is configured to receive a bottom-most portion of the bottom trim member.

6. A bottom trim clamp assembly according to claim 1, wherein the locking tab comprises at least one circumferential tooth on an inside surface that protrudes from the inside surface.

7. A boat windshield assembly comprising:
   a windshield;
   a bottom trim member secured to the windshield, the bottom trim member having connecting structure including a concave distal end, a protrusion and an upper portion; and
   a bottom trim clamp assembly for securing the windshield and the bottom trim member to a boat surface, the bottom trim clamp assembly comprising:
      a base clamp securable to the boat surface, the base clamp including at least one base tab being oriented to extend upward away from the boat surface and being cooperable with the connecting structure, and
      a locking tab selectively securable to the base clamp, the locking tab being oriented to extend downward toward the boat surface and being cooperable with the connecting structure,
   wherein the at least one base tab and the locking tab are engageable with the protrusion on opposite sides of the protrusion, the at least one base tab and the locking tab being configured to secure the bottom trim member to the bottom trim clamp assembly.

8. A boat windshield assembly according to claim 7, wherein the at least one base tab is engaged with the protrusion.

9. A boat windshield assembly comprising:
   a windshield;
   a bottom trim member secured to the windshield, the bottom trim member having connecting structure including a concave distal end, a protrusion and an upper portion; and
   a bottom trim clamp assembly for securing the windshield and the bottom trim member to a boat surface, the bottom trim clamp assembly comprising:
      a base clamp securable to the boat surface, the base clamp including at least one base tab being oriented to extend upward away from the boat surface and being cooperable with the connecting structure, and
      a locking tab selectively securable to the base clamp, the locking tab being oriented to extend downward toward the boat surface and being cooperable with the connecting structure, wherein the protrusion is spaced from the upper portion to define a base tab slot, and wherein the at least one base tab is engaged with the protrusion and is disposed in the base tab slot.

10. A boat windshield assembly according to claim 9, wherein the locking tab is selectively engageable with the protrusion.

11. A boat windshield assembly according to claim 10, wherein the concave distal end is spaced from the protrusion to define a locking tab slot, and wherein the locking tab is selectively engageable with the protrusion in the locking tab slot.

12. A boat windshield assembly according to claim 11, wherein the base tab slot and the locking tab slot have respective depths that permit the bottom trim member to be displaceable relative to the bottom trim clamp assembly between an upright position and an inclined orientation.

13. A boat windshield assembly according to claim 12, wherein in the upright position, the bottom trim member is substantially vertical such that the windshield is oriented about 90☐ relative to the boat surface, and wherein in the inclined orientation, the bottom trim member is inclined at an angle of about 35☐ relative to the boat surface.

14. A boat windshield assembly according to claim 11, wherein the base clamp comprises an extension member that is engageable with the concave distal end of the bottom trim member, the extension member being spaced from the locking tab to define a bottom slot, and wherein the concave distal end of the bottom trim member is disposed in the bottom slot.

15. A boat windshield assembly according to claim 7, wherein the at least one base tab and the locking tab are curved to surround the protrusion in a claw grip.

16. A boat windshield assembly according to claim 7, wherein the bottom trim clamp assembly comprises two of the base tabs, and wherein the locking tab is securable to the base clamp between the two base tabs.

17. A method of securing a windshield with a bottom trim member to a boat surface using a bottom trim clamp assembly, the bottom trim member having connecting structure, and the bottom trim clamp assembly having a base clamp and a locking tab, the method comprising:
  (a) positioning the windshield and the bottom trim member on the boat surface;
  (b) engaging the bottom trim clamp assembly with the connecting structure of the bottom trim;
  (c) securing the bottom trim clamp assembly to the boat surface; and
  (d) engaging the locking tab with the bottom trim member and securing the locking tab to the base clamp.

18. A method according to claim 17, further comprising, after step (c) and before step (d), removing the windshield and the bottom trim member from the boat surface for shipping.

\* \* \* \* \*